(12) United States Patent
Balraj et al.

(10) Patent No.: US 8,499,119 B2
(45) Date of Patent: Jul. 30, 2013

(54) METHOD AND APPARATUS FOR DELIVERING AND CACHING MULTIPLE PIECES OF CONTENT

(75) Inventors: Sajith Balraj, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 12/419,193

(22) Filed: Apr. 6, 2009

(65) Prior Publication Data

US 2009/0254708 A1  Oct. 8, 2009

Related U.S. Application Data

(60) Provisional application No. 61/043,033, filed on Apr. 7, 2008.

(51) Int. Cl.
*G06F 12/00* (2006.01)
(52) U.S. Cl.
USPC ........... 711/118; 711/138; 711/141; 711/158; 711/106; 711/137
(58) Field of Classification Search
CPC ........ G06F 17/30; G06F 11/0793; H04L 29/08
USPC ................. 711/118, 138, 141, 158, 106, 137, 711/154
See application file for complete search history.

(56) References Cited

U.S. PATENT DOCUMENTS

| 7,676,554 | B1 * | 3/2010 | Malmskog et al. ........... 709/219 |
| 7,979,509 | B1 * | 7/2011 | Malmskog et al. ........... 709/219 |
| 2007/0186064 | A1 | 8/2007 | Roh et al. |
| 2007/0206799 | A1 | 9/2007 | Wingert et al. |
| 2007/0283449 | A1 | 12/2007 | Blum et al. |
| 2008/0040354 | A1 | 2/2008 | Ray et al. |

FOREIGN PATENT DOCUMENTS

| CN | 1655601 A | 8/2005 |
| CN | 1783852 A | 6/2006 |
| CN | 1812370 A | 8/2006 |
| CN | 101017697 A | 8/2007 |
| EP | 1280149 | 1/2003 |
| EP | 1965296 | 9/2003 |
| EP | 1376299 | 1/2004 |
| EP | 1783632 A1 | 5/2007 |
| WO | 03026187 | 3/2003 |
| WO | 2005041536 | 5/2005 |

OTHER PUBLICATIONS

International Search Report, PCT/US2009/039800, International Searching Authority, European Patent Office, Nov. 11, 2009.
Written Opinion, PCT/US2009/039800, International Searching Authority, European Patent Office, Nov. 11, 2009.
Agarwal, S., et al., "Intelligent content caching for mobile services", XP055040860, pp. 1-4, 2003.

* cited by examiner

*Primary Examiner* — Thong Q Le
(74) *Attorney, Agent, or Firm* — The Marbury Law Group, PLLC

(57) ABSTRACT

Aspects relate to systems and methods for providing the ability to customize content delivery. A device can cache multiple presentations. The device can establish a cache depth upon initiation of the subscription service. The device can provide an interface to select a cache depth. The cache depth can be the number of presentations the device will maintain on the device at a given time.

96 Claims, 9 Drawing Sheets

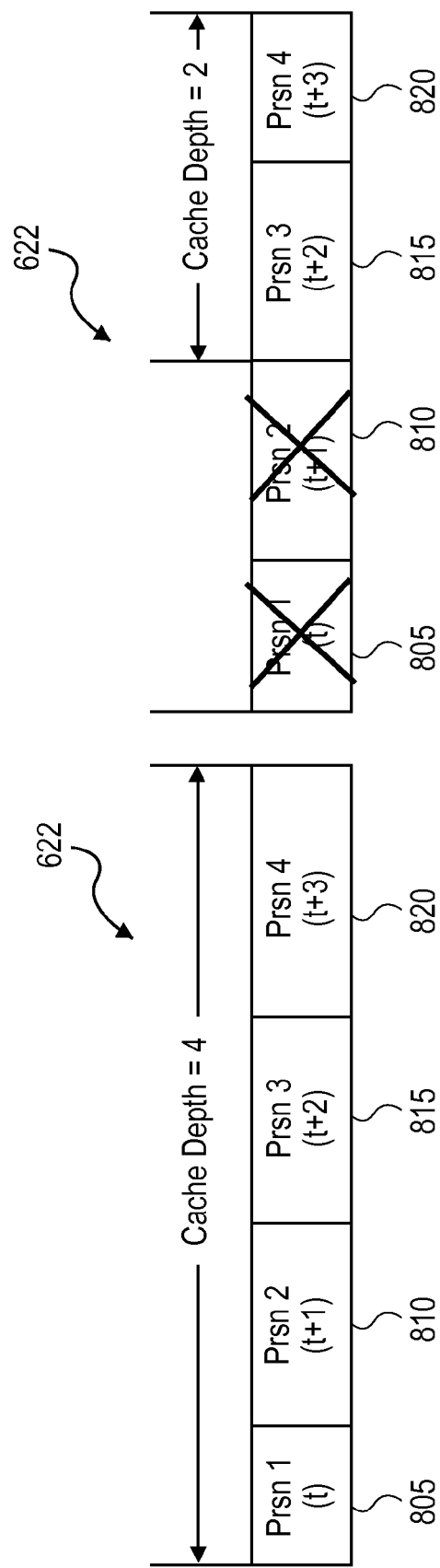

METHOD AND APPARATUS FOR DELIVERING AND CACHING MULTIPLE PIECES OF CONTENT

CROSS REFERENCE TO RELATED APPLICATIONS

This application is related and claims priority to U.S. Provisional Application No. 61/043,033, filed Apr. 7, 2008, assigned or under obligation of assignment to the assignee of the present application, entitled "Method and Apparatus for Delivering and Caching Multiple Pieces of Content," which provisional application is incorporated herein, in its entirety, by reference.

BACKGROUND

Content delivery systems, such as wireless multicast platforms, host and deliver a variety of video, audio and other content to users on a subscription or other basis. In the case of media delivered to mobile users over the air interface, the content can include video or audio clips delivered by a service to the handset. The service in general can produce media content such as news, sports, business, weather or other video or audio programming, and make that media content available to wireless users under arrangement with the wireless carrier. The content delivered by the service can be broken down into individual channels, such as channels for streaming stock quotes, sports scores, weather forecasts or others.

In current systems, the content can be downloaded onto a user's device. The user, however, is limited to storing and viewing one piece of content downloaded onto the device. As such, the user may have limited viewing choices and miss or lose downloaded content if not viewed before the content expires. It may be desirable to provide methods and apparatus for downloading and caching multi-pieces of content in wireless or other content delivery systems.

DESCRIPTION OF THE DRAWINGS

The accompanying drawings, which are incorporated in and constitute a part of this specification, illustrate aspects of the present teachings and together with the description, serve to explain the principles of the present teachings. In the figures:

FIGS. 7A, 7B, 8A, and 8B illustrate exemplary cache configurations and management processes, according to various aspects;

DETAILED DESCRIPTION

Figure 1:
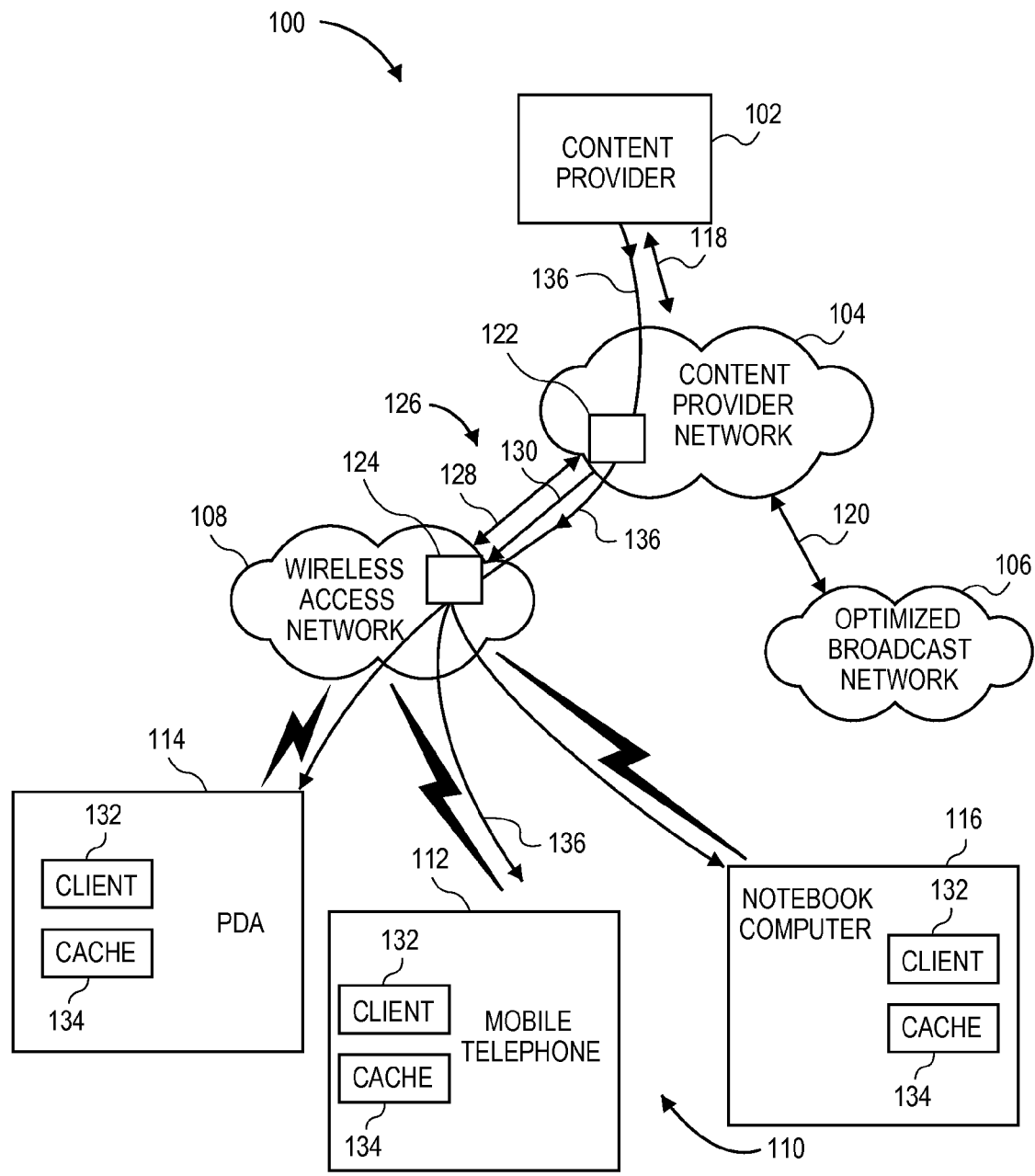
FIG. 1 illustrates an exemplary overall system for content delivery, according to various aspects.

According to aspects, a content delivery system can be configured to allow a user to customize content maintained on a personal device. In aspects, the content delivery system can be or include a wireless content delivery system, such as the MediaFLO™ system developed by the Qualcomm Inc. of San Diego, Calif. In aspects, the content delivery system can be or include a content delivery platform based on wired or optical connections, in addition to or instead of a wireless interface. In general, the content delivered by the content delivery system can include video media, such as video clips encoded in the Real™ format, the Motion Pictures Group (.mpg) format, the Windows Media format by Microsoft™ Corp., or other video codec or format. The content can further include audio media, such as music tracks or broadcast recordings encoded in Motion Pictures Expert Group (MPEG)-1 Audio Layer 3 (MP3) format, Microsoft Corp. .wav format, RealAudio™ format, or other audio codec or format. The content can further include datacast contents such as JPEG files, PNG files and HTML files.

As used at times herein, a "service" can refer to a collection of content typically generated by a content provider, such as television organizations or broadcast radio operators. A "presentation" as used at times herein can refer to a discrete content instance that is carried or produced by a service, such as a television sitcom episode or particular sporting event. A presentation typically has an associated title for the user in a media program guide, such as a television guide or list of streaming media. System information can also be provided with the content. System information as sometimes used herein can be or include the metadata describing the content delivery system and/or available content in the content delivery system.

According to aspects of the present teachings in one regard, the content delivery system provides a user with the ability to customize content delivery. To achieve this, a device can also allow the user to cache multiple presentations. The device can establish a default cache depth upon initiation of a service. The device can provide an interface to the user to select a cache depth. The cache depth can be the number of presentations the device will maintain on the device at a given time.

In one or more aspects, once presentations have been cached, the device can provide a multi-view interface to the user to allow the select cached presentations to be viewed. The device can populate the multi-view interface with information related to the service and presentations received from the content delivery system.

When the device receives new presentations, the device can cache the presentations in the device until the cache depth is reached. Once the cache depth is reached, the device can replace the cached presentations with newly received presentations. The device can replace the cached presentations based on a First-In/First-Out (FIFO) scheme.

Reference will now be made in detail to exemplary aspects of the present teachings, which are illustrated in the accompanying drawings. Where possible the same reference numbers will be used throughout the drawings to refer to the same or like parts.

FIG. 1 shows an exemplary communication network 100 that comprises one aspect of a content delivery system that operates to create and transport multimedia content flows across data networks. For example, the content delivery system can be suitable for use in transporting presentations from a content provider network to a wireless access network for broadcast distribution. One skilled in the art will realize that communication network 100 is exemplary. The components of communication network 100 can be modified or combined and additional components can be added.

In one or more aspects, the network 100 can include one or more content providers (CP) 102, a content provider network 104, an optimized broadcast network 106, and a wireless access network 108. The network 100 also includes devices 110 that can include a mobile telephone 112, a personal digital assistance (PDA) 114, and a notebook computer 116. The devices 110 illustrate just some of the devices that are suitable for use in one or more aspects of the content delivery system. It should be noted that although three devices are shown in FIG. 1, virtually any number of devices, or types of devices are suitable for use in the content delivery system.

In one or more aspects, the CP 102 operates to provide content 136, for example one or more presentations, for distribution to users in the network 100. The CP 102 provides the content 136 to the content provider network 104 for distribution. For example, the CP 102 communicates with the content provider network 104 via the communication link 118, which includes any suitable type of wired and/or wireless communication link.

In one or more aspects, the content provider network 104 can include any combination of wired and wireless networks that operate to distribute the content 136 for delivery to the devices 110 and users. The content provider network 104 communicates with the optimized broadcast network 106 via the link 120. The link 120 can include any suitable type of wired and/or wireless communication link. The optimized broadcast network 106 can include any combination of wired and wireless networks that are designed to broadcast high quality content. For example, the optimized broadcast network 106 can be a specialized proprietary network that has been optimized to deliver high quality content to selected devices over a plurality of optimized communication channels.

In one or more aspects, the content delivery system can operate to deliver the content 136 from the CP 102 for distribution to one or more content servers (CS) 122 at the content provider network 104 that operates to communicate with a broadcast base station (BBS) 124 at the wireless access network 108. The content delivery system allows the CS 122 to receive the content 136, such as presentations, guide information and other related information, from content provider 102. The CS 122 updates and/or creates content flows for delivery to devices 110.

In one or more aspects, the CS 122 and the BBS 124 can communicate using one or more aspects of a transport interface 126 that allows the content provider network 104 to deliver the content 136 in the form of content flows to the wireless access network 108 for broadcast/multicast to the devices 110. The transport interface 126 can include a control interface 128 and a bearer channel 130. The control interface 128 operates to allow the CS 122 to add, change, cancel, or otherwise modify content flows that flow from the content provider network 104 to the wireless access network 108. The bearer channel 130 operates to transport the content flows from the content provider network 104 to the wireless access network 108.

In one or more aspects, the CS 122 can use the transport interface 126 to schedule a content flow to be transmitted to the BBS 124 for broadcast/multicast over the wireless access network 108. For example, the content flow can include a real-time or non real-time content, for example one or more presentations, that was provided by the CP 102 for distribution using the content provider network 104. In one aspect, the CS 122 can operate to negotiate with the BBS 124 to determine one or more parameters associated with the wireless access network 108. Once the BBS 124 receives the presentation, it broadcasts/multicasts the presentation over the wireless access network 108 for reception by one or more of the devices 110. Any of the devices 110 can be authorized to receive the presentation and cache it for later viewing by the device user.

In one or more aspects, the device 110 can include a client 132 that operates to provide a user interface that displays a listing of the content 136, for example one or more presentations, that is scheduled for broadcast over the wireless access network 108. The device user can then select to receive any particular content for rendering in real-time or to be stored in a cache 134 for later viewing. For example, a particular presentation can be scheduled for broadcast during the evening hours, and the device 112 operates to receive the broadcast and cache the presentation in the cache 134 so that the device user may view the clip the next day. Typically, the content 136 can be broadcast as part of a service, such as a subscription service, and the receiving device can need to provide a decryption key or otherwise authenticate itself to receive the broadcast.

In one or more aspects, the client 132 can also allow the user to cache multiple presentations in the cache 134. To achieve this, the client 132 can establish a default cache depth upon initiation of a service, such as a subscription service. The client 132 can provide an interface to the user to select a cache depth. The cache depth can be the number of presentations the client 132 will maintain in the cache 134 at a given time.

In one or more aspects, once presentations have been cached, the client 132 can provide a multi-view interface to the user to allow the cached presentations to be viewed. The client 132 can populate the multi-view interface with information related to the service and presentations received from CS 122.

When the device 110 receives presentations, the client 132 can cache the presentations in the cache 134 until the cache depth is reached. Once the cache depth is reached, the client 132 can replace the cached presentations with newly received presentations. The client 132 can replace the cached presentations based on a First-In/First-Out (FIFO) scheme.

One skilled in the art will realize that communication network 100 is exemplary. In the content delivery system of the aspects, communication network 100 can be arranged in any configuration and include any components necessary to deliver the content 136 from CP 102 to devices 110 via CS 122.

Figure 2:
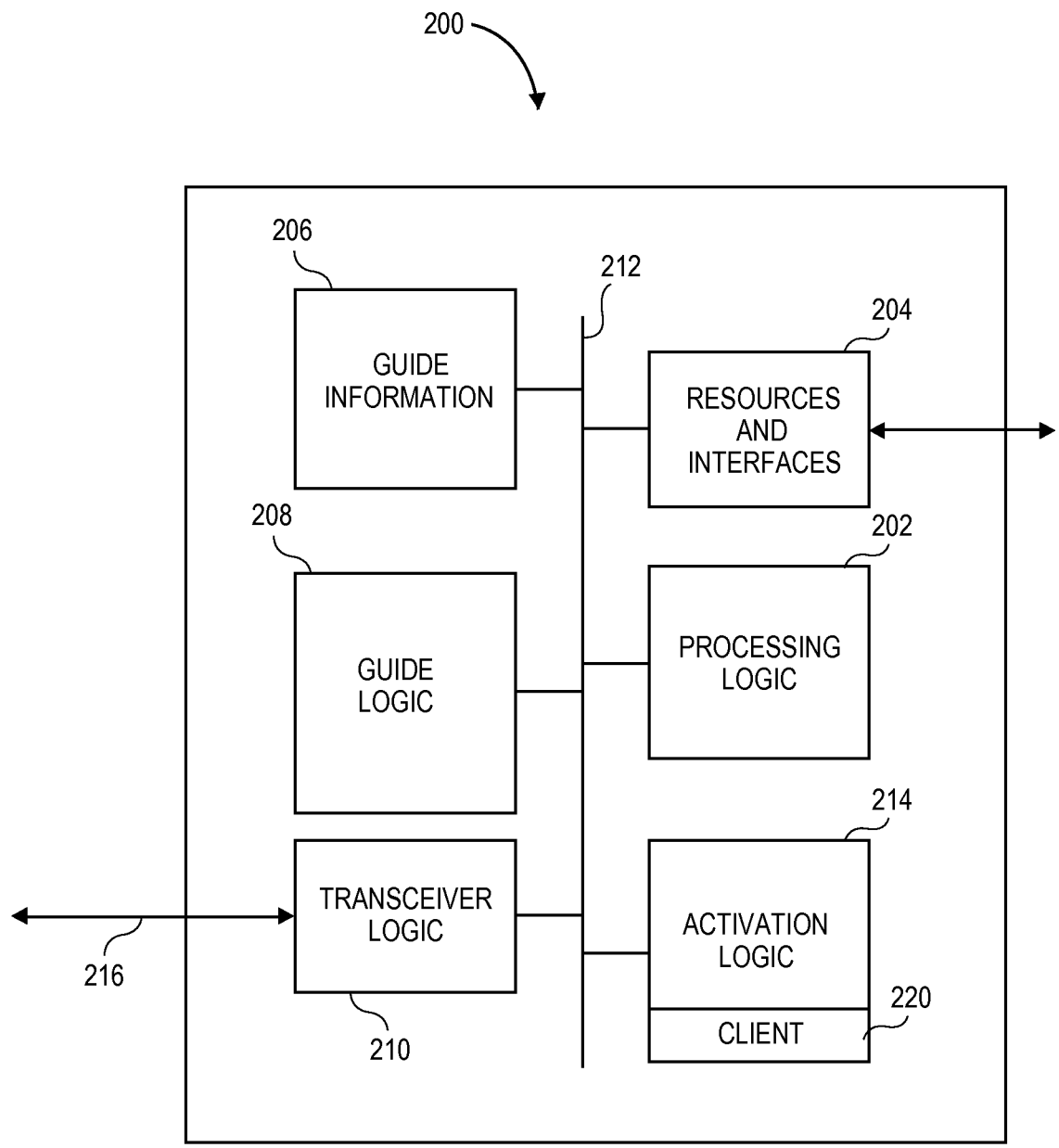
FIG. 2 illustrates an exemplary content provider server, according to various aspects.

FIG. 2 shows one aspect of a content provider server 200 suitable for use in one aspect of the content delivery system. For example, the server 200 can be used as the CP 102 in FIG. 1. The server 200 can include processing logic 202, resources and interfaces 204, and transceiver logic 210, all coupled to an internal data bus 212. The server 200 can include activation logic 214, guide information 206, and guide logic 208, which are also coupled to the data bus 212.

In one or more aspects, the processing logic 202 can include a CPU, processor, gate array, hardware logic, memory elements, virtual machine, software, and/or any combination of hardware and software. Thus, the processing logic 202 can generally include logic to execute machine-readable instructions and to control one or more other functional elements of the server 200 via the internal data bus 212.

In one or more aspects, the resources and interfaces 204 can include hardware and/or software that allow the server 200 to communicate with internal and external systems. For example, the internal systems can include mass storage systems, memory, display driver, modem, or other internal device resources. The external systems can include user interface devices, printers, disk drives, or other local devices or systems.

In one or more aspects, the transceiver logic 210 can include hardware logic and/or software that operate to allow the server 200 to transmit and receive data and/or other information with remote devices or systems using communication channel 216. For example, in one aspect, the communication channel 216 can include any suitable type of communication link, such as link 118 illustrated in FIG. 1, to allow the server 200 to communicate with a data network, such as the content provider network 104.

In one or more aspects, the activation logic 214 can include a CPU, processor, gate array, hardware logic, memory elements, virtual machine, software, and/or any combination of hardware and software. The activation logic 214 operates to activate a CS, such as CS 122, and/or a device to allow the CS and/or the device to select and receive content and/or services described in the guide information 206. In one aspect, the activation logic 214 can transmit a client 220 or server (not shown) to the CS and/or the device during the activation process. The client program 220 runs on the CS and/or the device to receive the guide information 206 and display information about available content or services to the user of the CS and/or device. Thus, the activation logic 214 operates to authenticate a CS and/or a device, download the client 220, and download the guide information 206 for rendering on the CS or the device by the client 220.

In one or more aspects, the guide information 206 can include information in any suitable format that describes content and/or services that are available for a CS and/or devices to receive. For example, the guide information 206 can be stored in a local memory of the server 200 and can include information such as content or service identifiers, scheduling information, pricing, and/or any other type of relevant information. The guide information 206 can also include information describing the content, such as a presentation title and presentation description and other attributes that are specific to a presentation. Additionally, the guide information 206 can include other information about access and availability such as expiry duration for presentation or service, and/or explicit expiry time for presentations.

In one or more aspects, the guide logic 208 can include hardware and/or software that operate to generate notification messages that identify and/or describe changes to the guide information 206. For example, when the processing logic 202 updates the guide information 206, the guide logic 208 is notified about the changes. The guide logic 208 can generate one or more notification messages that are transmitted to one or more CS, which may have been activated with the server 200, so that these one or more CS are promptly notified about the changes to the guide information 206.

In one or more aspects, the server 200, including for example guide information 206, guide logic 208, activation logic 214, client 220, can include program instructions stored on a computer-readable media, which when executed by a processor, for instance, the processing logic 202, provides the functions of the server 200 described herein. For example, the program instructions may be loaded into the server 200 from a computer-readable media, such as a floppy disk, CDROM, memory card, FLASH memory device, RAM, ROM, or any other type of memory device or computer-readable media that interfaces to the server 200 through the resources 204. In another aspect, the instructions may be downloaded into the server 200 from an external device or network resource that interfaces to the server 200 through the transceiver logic 210. The program instructions, when executed by the processing logic 202, provide one or more aspects of the content delivery system as described herein.

Figure 3:
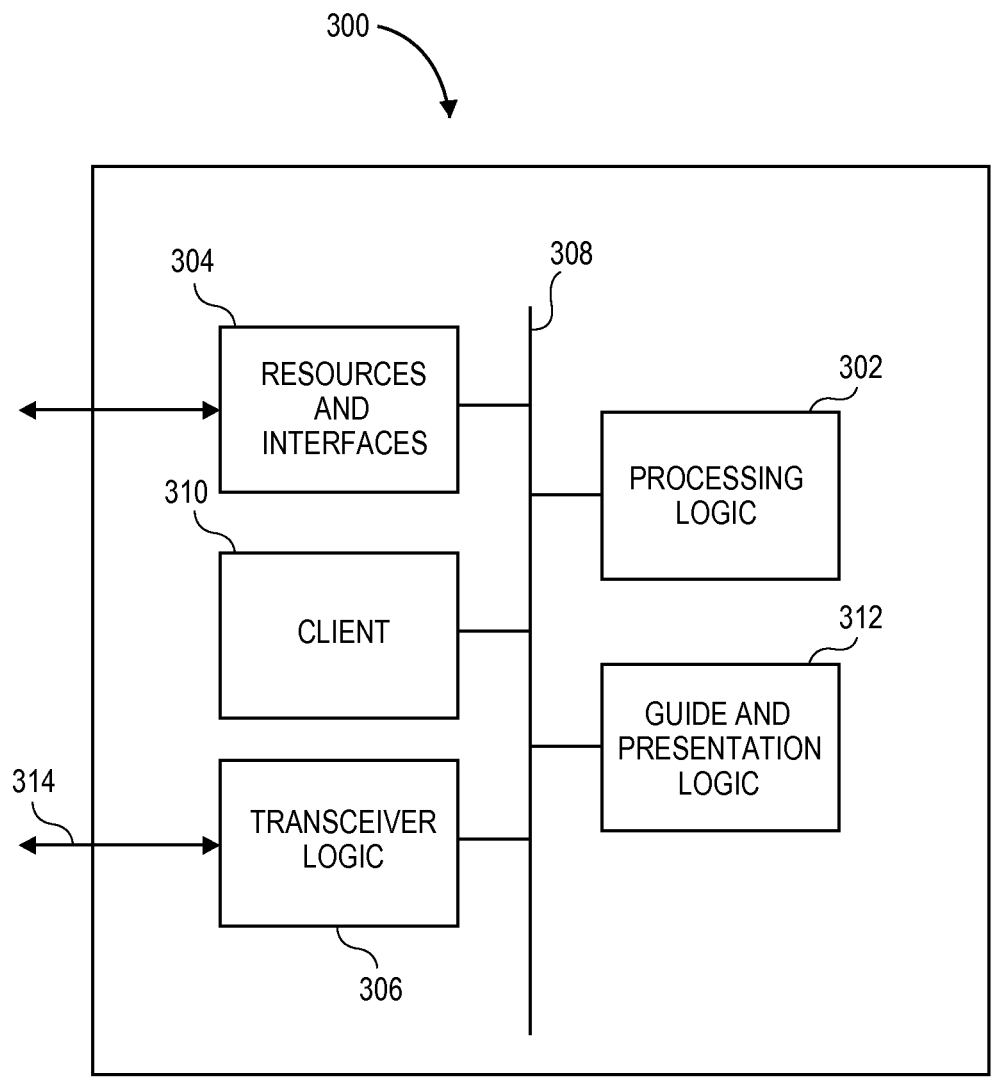
FIG. 3 illustrates an exemplary content server, according to various aspects.

FIG. 3 shows one aspect of a content server (CS) 300 suitable for use in one aspect of a content delivery system. For example, CS 300 can be the CS 122 shown in FIG. 1. The CS 300 can include processing logic 302, resources and interfaces 304, and transceiver logic 306, all coupled to a data bus 308. The CS 300 can also include a content server (CS) client 310, and a guide and presentation (GP) logic 312, which are also coupled to the data bus 308.

In one or more aspects, the processing logic 302 can include a CPU, processor, gate array, hardware logic, memory elements, virtual machine, software, and/or any combination of hardware and software. Thus, the processing logic 302 can generally include logic configured to execute machine-readable instructions and to control one or more other functional elements of the CS 300 via the internal data bus 308.

In one or more aspects, the resources and interfaces 304 can include hardware and/or software that allow the CS 300 to communicate with internal and external systems. For example, internal systems can include mass storage systems, memory, display driver, modem, or other internal device resources. The external systems can include user interface devices, printers, disk drives, or other local devices or systems.

In one or more aspects, the transceiver logic 306 can include hardware and/or software that operate to allow the CS 300 to transmit and receive data and/or other information with external devices or systems through communication channel 314. For example, the communication channel 314 can include a network communication link, a wireless communication link, or any other type of communication link, such as links 118, 120, and 126 as illustrated in FIG. 1.

In one or more aspects, during operation, the CS 300 can be activated so that it can receive and serve available content or services over a data network. For example, in one aspect, the CS 300 can identify itself to a content provider server, for example server 200, during an activation process. As part of the activation process, the CS 300 can receive and store guide information and presentations by GP logic 312. The GP logic 312 can contain information that identifies content or services available for the CS 300 to receive and serve to the devices 110. The CS client 310 operates to render information in the GP logic 312 on the CS 300 using the resources and interfaces 304. Additionally, the CS client 310 can operate to generate and provide the content flows to the devices 110.

In one or more aspects, the CS 300 receives guide information and presentations via transceiver logic 306. The guide information can include information that describes the content available. Additionally, the guide information can include information regarding the availably and accessibility of the content such as expiry duration for a service or presentation and an explicit expiry time for a presentation.

In one or more aspects, the CS client 310 utilizes the guide information in order to construct the content flow to be provided to a device, such as device 110. In constructing the content flow, the CS client 310 can construct a presentation definition record to be included with the presentation. The presentation definition record can include information that describes the presentations contained in a content flow. For example, the presentation definition record can include information such as title of a presentation and a description of the presentation. The presentation definition record can also include information defining the accessibility and availability of the presentation, such as presentation expiry time, decryption keys to access the presentation, and the like. Additionally, service information can be provided in system information (SI) record. The service information can include information that describes the service for which the content is being provided.

In one or more aspects, the content provided by CS 300 can be related to a service, such as a subscription service. For example, a user of device 110 can subscribe to the subscription service and receive content based on the terms of the subscription service. For content provided related to a service, the content can have a limited time period for which the content can be available to users. For example, each presentation on a service can have an expiry time (time at which the presentation is no longer accessible) associated with the service or the presentation. The presentation expiry time can be determined based on a presentation expiry duration (amount of time the presentation is accessible) or an explicit expiry time. The presentation expiry duration and/or explicit expiry time can be provisioned per the service or provisioned per presentation. The presentation expiry duration and/or explicit expiry time can be set and provided by the CP 102 or other system associated with the CP 102.

In one or more aspects, as mentioned above, the presentation expiry time can be based on an expiry duration. If the CS 300 receives an expiry duration instead of an explicit expiry time from the CP 102, the CS 300 can calculate the presentation expiry time based on the presentation expiry duration. The CS 300 can utilize the CS client 310 to calculate the presentation expiry time. If the CS 300 receives an explicit expiry time for the presentation from the CP 200, the CS 300 can use the explicit expiry time as the expiry time for the presentation.

In one or more aspects, the CS 300 can calculate the presentation expiry time based on contact window (time period in which the presentation is accessible), contact start window (start time in which the presentation becomes accessible), and/or the presentation expiry duration (amount of time the presentation is accessible). For example, when calculating the presentation expiry time based on the expiry duration for a presentation with a single contact window, the CS 300 can add the expiry duration to the contact start window for that presentation. When calculating the presentation expiry time for a presentation based on the expiry duration for a presentation with multiple contact windows, the CS 300 can add the expiry duration to the contact start window of the last contact window for that presentation.

In one or more aspects, the presentation may not have an associated contact window (time period in which the presentation is accessible). The presentation can be available for viewing on the device 110 at the time it is downloaded, and the latest possible time at which the presentation can be available on the device is the presentation expiry time.

In one or more aspects, the accessibility start time of the presentation can be defined as the contact start window in the contact window (in the case of multiple contact windows this can be the beginning time of the first contact window) since this is the earliest time at which the presentation can be accessible on the device 110. The availability end time can be given by the presentation expiry time, whether based on an expiry duration or an explicit expiry.

In one or more aspects, in order to control access to the content, the CS 300 can provide the presentation expiry time with the content provided to the devices 110. For example, the CS client 310 can include the presentation expiry time in the presentation definition record sent to the device 110.

In one or more aspects, in order to prevent access upon occurrence of the presentation expiry time, the presentations, which do not contain access control measures, can be deleted at the presentation expiry time. Additionally, in order to prevent access prior to the contact window or upon occurrence of the presentation expiry time, the presentation's accessibility can be achieved by access control measures and/or digital rights management schemes, such as encryption scheme.

In one or more aspects, the presentation expiry time can be based on access control measures and/or digital rights management schemes, such as the encryption status of the presentations. For example, when content is received, the CS 300 can secure the presentation with a presentation key or keys utilizing any type of well-known cryptographic processes or schemes, for example symmetric or asymmetric encryption. Likewise, the CP 102 can secure the presentations and provide the presentation key or keys to the CS 300. Once encrypted, the CS 300 can provide the presentation key or keys to a Conditional Access Server (not shown). The CAS can secure the presentation key with an encryption key (service key) utilizing any type of well-known cryptographic processes or scheme, for example symmetric or asymmetric encryption. The CAS can be located at the CP 102, the content provider network 104, or other location associated with the content and/or service. Once completed, the CAS can return the encrypted presentation key to the CS 300, which in-turn, can provide the encrypted presentation key with the secured presentation. Additionally, the CAS can provide the device 110 with the service key at the time of subscription to the service. To access a secured presentation, the device 110 can utilize the service key to decrypt the encrypted presentation key and utilize the presentation key to access the presentation.

In one or more aspects, the CAS can utilize different service keys for different services. Additionally, the CAS can periodically change service keys for a service. As such, a particular service key can grant access to a presentation associated with a service for a specific period of time or "Epoch". To enable access across different Epochs, the CS 300 can provide, to the CAS, the availability start time and expiry duration for the presentation along with the presentation key. The CAS may not have Epochs that match the accessibility start time or defined for the entire time period the presentation is accessible when the request is made by the CS 300. To provide access for the entire accessibility time period, the CAS can return multiple encrypted presentation keys, each encrypted presentation key secured with the service key for the Epochs defined in the CAS that the accessibility of the presentation spans.

In one or more aspects, the CS 300 can add the encrypted presentation keys for the presentation to the presentation definition record for that presentation. The device 110 can download the presentation definition record containing the encrypted presentation keys, in addition to the presentation, in order to access the presentation.

In one or more aspects, when the Epochs and the accessibility start time or time period do not match, there can occur two scenarios for the presentation expiry time of a secured presentation:

1. The presentation expiry time is before the expiry time of the latest encrypted presentation key in the presentation definition record; and 2. The presentation expiry time is after the expiry time of the latest encrypted presentation key in the presentation definition record.

Figure 4:
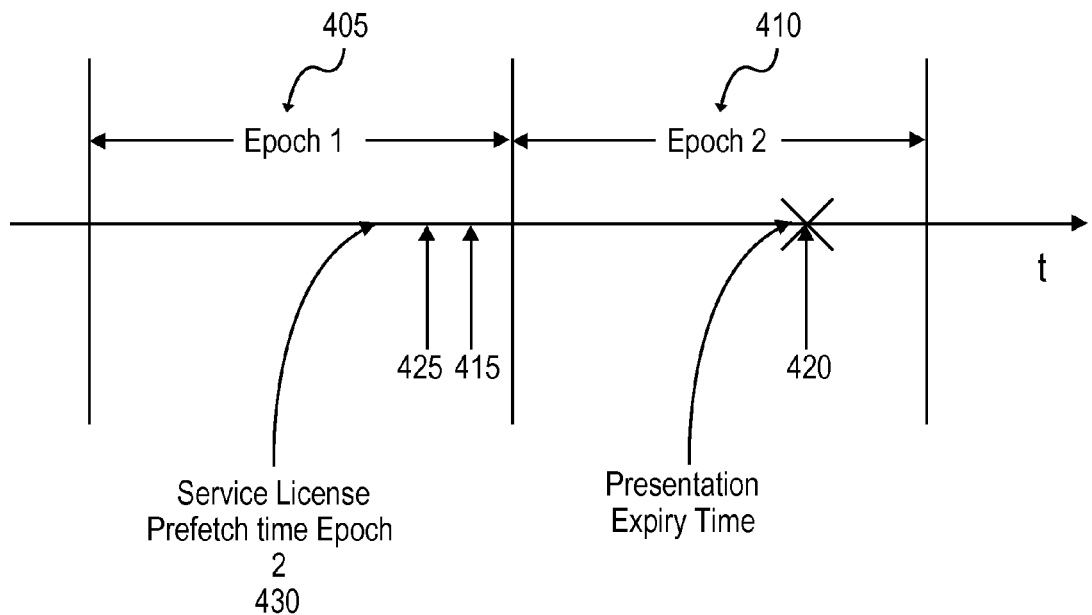
FIGS. 4 and 5 illustrate examples of presentation expiration, according to various aspects.
Figure 5:
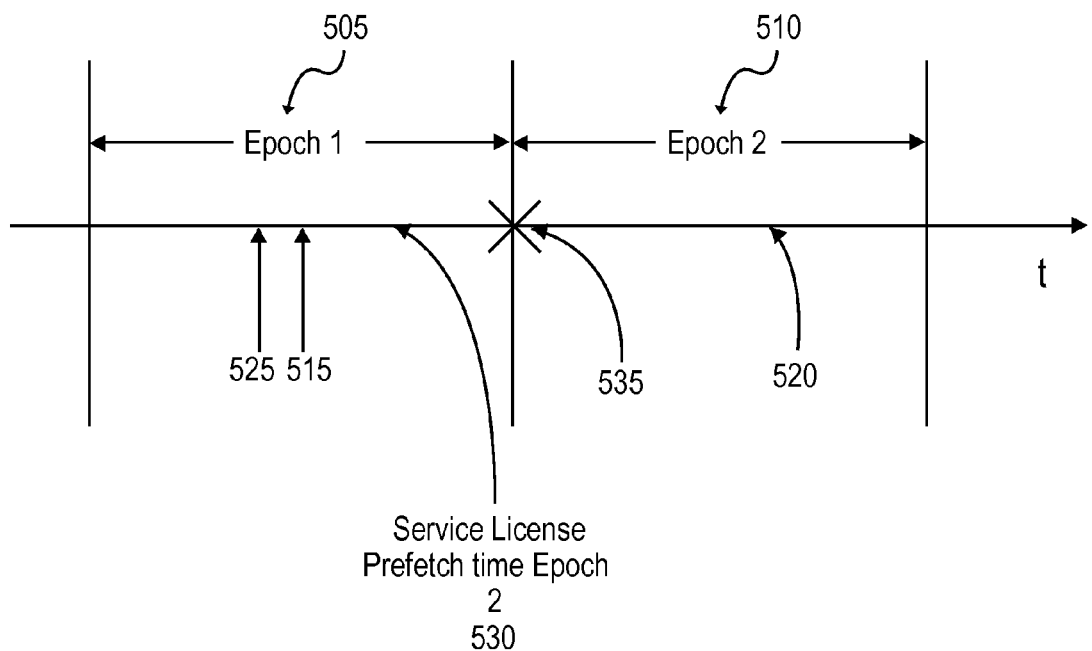

Access to the presentation can be controlled by a number of processes in order to ensure that the device 110 has access to the encrypted presentation keys necessary for the times the presentation are accessible. FIGS. 4 and 5 illustrate two exemplary scenarios in which access to the presentation can be controlled.

In one or more aspects, FIG. 4 shows an exemplary scenario in which a particular presentation is marked for deletion at a presentation expiry time. As illustrated, a service can have two Epochs, "Epoch 1" 405 and "Epoch 2" 410, and each Epoch can have different service keys. In this exemplary scenario, the CS 300 can schedule a delivery time 415 for the particular presentation during "Epoch 1" 405 and the particular presentation can have a presentation expiry time 420 during "Epoch 2" 410.

At time 425, the CS 300 can request the encrypted presentation keys for the particular presentation from the CAS. Since the time 425 is after the Service License prefetch time 430 for "Epoch 2" 410, the CAS will return the encrypted presentation keys for "Epoch 1" 405 and "Epoch 2" 410. Service License Prefetch time 430 for an Epoch can be the earliest time at which the Service license will be available on the CAS for the associated Epoch (i.e. the earliest time at which the CS 300 can request encrypted presentation keys for that Epoch). At time 415, the CS 300 can broadcast over the air the file carrying the particular presentation and the encrypted presentation keys for "Epoch 1" 405 and "Epoch 2" 410.

If the particular presentation is available on the device 110, the presentation can be marked for delete at the presentation expiry 420 even though Epoch 2 has not expired and the encrypted presentation key and service key for Epoch 2 are available on the device 110.

In one or more aspects, FIG. 5 shows an exemplary scenario in which a particular presentation is marked for delete at expiry of the latest Epoch for which the presentation has an encrypted presentation key. As illustrated, the particular presentation can have two Epochs, "Epoch 1" 505 and "Epoch 2" 510, and each Epoch can have different service keys. In this exemplary scenario, the CS 300 can schedule a delivery time 515 for the particular presentation during "Epoch 1" 505 and the particular presentation can have a presentation expiry time 520 during "Epoch 2" 510.

At time 525, the CS 300 can request the encrypted presentation keys for the presentation from the CAS. Since this time is before the Service License Prefetch time 530 for "Epoch 2" 510, the CAS can return only the encrypted presentation key for "Epoch 1" 505 to the CS 300. The CS 300 can broadcast over the air the presentation and the encrypted presentation key for "Epoch 1" 505 at time 515. If the particular presentation is available on the device 110, the particular presentation can be marked for deletion at the time 535, the end time of "Epoch 1" 505.

In this exemplary scenario, the presentation can be marked for deletion because the CS 300 is not able to retrieve the encrypted presentation key for the "Epoch 2" 510 and the device 110 does not have the encrypted presentation key and the presentation is still available on the device 110.

In one or more aspects described above, the CS 300 and the CAS can provide access control to the presentations utilizing cryptographic processes or schemes. One skilled in the art will realize that CS 300 or CP 102 can utilize any types of access control or digital rights management processes and schemes to control access to the content.

In one or more aspects, the CS 300, including for example the CS client 310, and the GP logic 312, can include program instructions stored on a computer-readable media, which when executed by a processor, such as the processing logic 302, provides the functions of the content delivery notification system as described herein. For example, instructions may be loaded into the CS 300 from a computer-readable media, such as a floppy disk, CDROM, memory card, FLASH memory device, RAM, ROM, or any other type of memory device or computer-readable media that interfaces to the CS 300 through the resources and interfaces 304. In another aspect, the instructions may be downloaded into the CS 300 from a network resource that interfaces to the CS 300 through the transceiver logic 306. The instructions, when executed by the processing logic 302, provide one or more aspects of a content delivery system as described herein. It should be noted that the CS 300 represents just one implementation and that other implementations are possible within the scope of the aspects.

Figure 6:
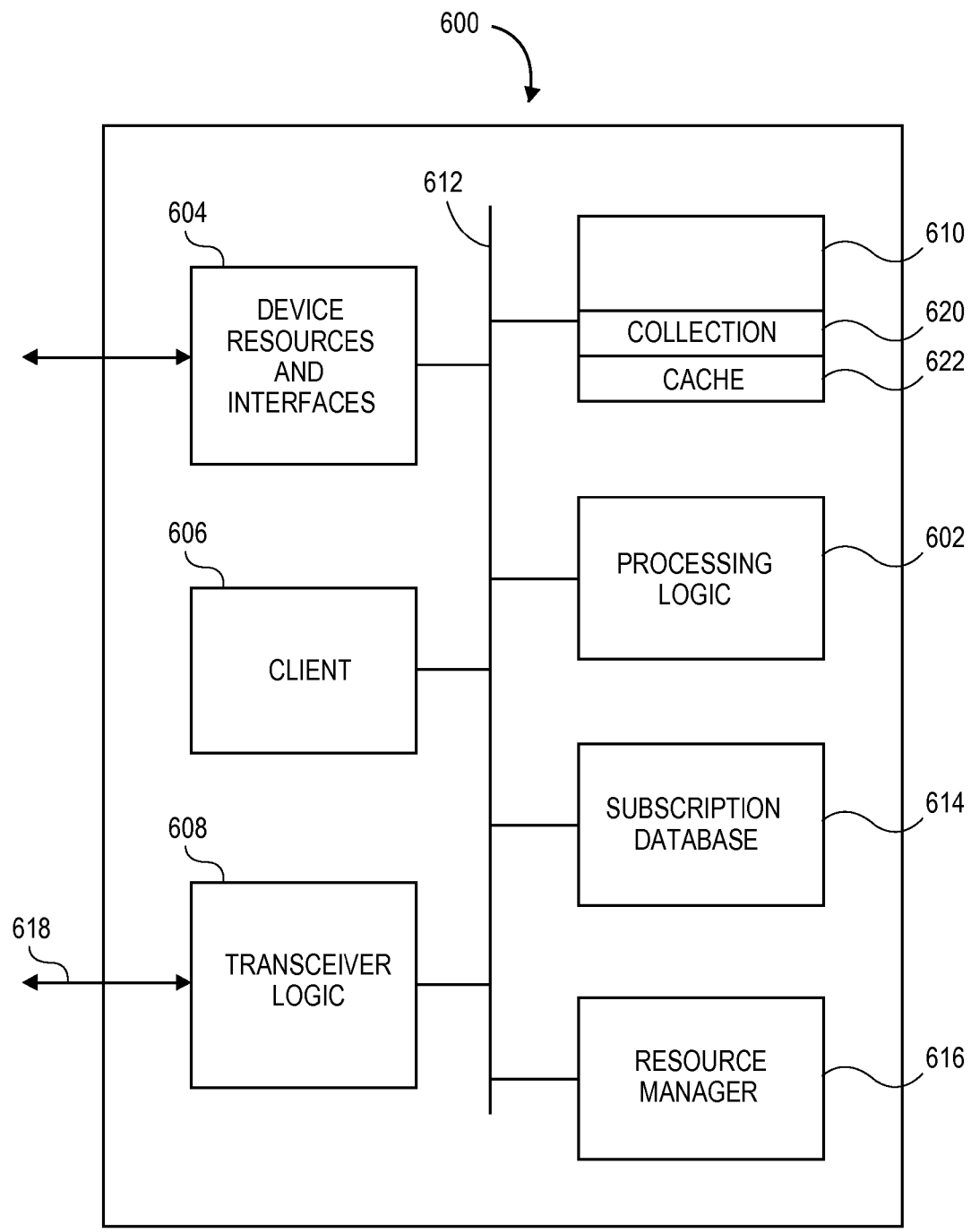
FIG. 6 illustrates an exemplary device, according to various aspects.

FIG. 6 shows one aspect of a device 600 suitable for use in one or more aspects of a content delivery system. Device 600 can be utilized as any one of the devices 110 show in FIG. 1. The device 600 can include processing logic 602, device resources and interfaces 604, transceiver logic 608, and memory 610 all coupled to a data bus 612. The device 600 can also include a client 606, a subscription database 614, and a resource manager 616, which are also coupled to the data bus 612.

In one or more aspects, the processing logic 602 can include a CPU, processor, gate array, hardware logic, memory elements, virtual machine, software, and/or any combination of hardware and software. Thus, the processing logic 602 can generally include logic to execute machine-readable instructions and to control one or more other functional elements of the device 600 via the internal data bus 612.

In one or more aspects, the device resources and interfaces 602 can include hardware and/or software that allow the device 600 to communicate with internal and external systems. For example, internal systems may include mass storage systems, memory, display driver, modem, positioning logic, or other internal device resources. The external systems can include user interface devices, displays, keyboards, printers, disk drives, or other local devices or systems.

In one or more aspects, the memory 610 can include RAM, ROM, Flash and/or any other suitable memory storage device. In one aspect, the memory 610 can include a collection memory portion 620, and a storage cache 622. Collection memory portion 620 can be utilized to collect the code packets for a presentation and perform message decoding to recover the presentation. Cache 622 can be utilized to store the presentations once decoded. The processing logic 602 can operate to configure the memory 610 and to allocate the memory portions 620 and 622.

In one or more aspects, the transceiver logic 608 can include hardware and/or software that operate to allow the device 600 to transmit and receive data and/or other information with external devices or systems using communication channel 618. For example, the communication channel 618 can include a wireless and/or wired network communication link or any other type of communication link, such as communication links supported by the wireless access network 108.

In one or more aspects, during operation, the device 600 can be activated with a content provider network, for example the content provider network 104, to subscribe to available subscription packages and services according to one or more aspects of the content delivery system. To receive, store, and view the content, the device 600 can utilize client 606. As part of the activation process, the device 600 reserves memory to satisfy a memory requirement to support the collection portion 620 and cache 622. The device 600 can allocate cache 622 to allow the user to cache multiple presentations.

In one or more aspects, the device 600 can cache or store presentations in the cache 622 based on a cache depth. The cache depth can be the number of presentation to store in the cache 622. The device 600 can cache multiple presentations based on:

1. Default cache depth—the number of presentations that the device 600 will retain by default after subscription;
2. Maximum cache depth—the maximum number of presentations that the user can retain on the device 600 for the subscribed service; and
3. Maximum presentation size—the maximum size of a single presentation on the subscribed service.

In one or more aspects, each of the presentations can have a presentation expiry time which is defined as the time at which the presentation will become inaccessible, for example deleted, by the device 600 as described above. To ensure adequate memory space to receive and decode a presentation, the size of the collection portion 620 can be defined by 1.5*Max Presentation Size.

In one or more aspects, upon subscription to a service, the device 600 can be set to a default cache depth. The device 600 can utilize the default cache depth to calculate the size of the cache 622 required to store received presentations at the time of subscription. The cache 622 required at the point of subscription can be given by:

(Default cache depth+1)*Maximum presentation size.

Default cache depth+1 can be used instead of default cache depth to ensure that a new presentation is successfully written into the cache 622 before an existing presentation is replaced.

In one or more aspects, after subscription, the user can be allowed to change the cache depth in order to increase or reduce the number of presentations stored in cache 622. The client 606 can provide an interface to the user to select a cache depth. The user can change the cache depth to any value between 0 and the maximum cache depth. The cache requirement is given by Size of the cache 622=(Cache depth+1)*Maximum presentation size, for 1<=cache depth<=Max cache depth
Size of the cache 622=0,
for cache depth=0

The cache depth of 0 can be a special case. A cache depth setting of 0 indicates that the user is not interested in receiving or storing any content from the content delivery system in the cache 622. When cache depth is 0, the device 600 can operate as an excluded clipcast service, for example presentations are accessible only during the contact window. The only difference is that by setting the cache depth to 0 the services can still be displayed to the user.

In one or more aspects, the user can increase the cache depth in order to store multiple presentations in the cache 622. The user can increase the cache depth only if there is enough available memory on the device 600 to satisfy the increased memory requirement. The device 600 can allow the user to increase the cache depth only if the memory 610 can support the following condition:

Memory Requirement<=Memory used by the service (collection 620 and cache 622)+Instantaneous Memory available on the Device.

The device 600 can determine the memory used by the service for increased cache depth by multiplying the new cache depth by the Maximum presentation size.

In one or more aspects, the user of the device 600 can subscribe to one or more services. As such, the cache depth for the device 600 can be set based on individual services or all the services. The user, utilizing the client 606, can select an overall cache depth for all services subscribed. Additionally, the user, utilizing the client 606, can select a cache depth for each particular service. For example, Sam subscribes to a package that has a Sports Service and a News Service. Sam, being a sports buff, sets the cache depth on the Sports Service to 4 and the cache depth on the News Service to 1. From that point on, the device retains 4 presentations on the Sports Service and 1 presentation on the News Service.

In one or more aspects, the client 606 can be downloaded from the content provider network through the transceiver logic 608 using the channel 618. The client 606 can include any suitable type of hardware/software that executes on the device 600 and communicates with the content provider network through the transceiver logic 608 to complete the activation process. Additionally, the client 606 can be installed on the device 600 during device manufacture, or may be downloaded from a third party. After activation, the client 606 operates on the device 600 to provide a user interface that displays information to the device user about available services subscription packages, configure the cache 622, access and view the content, and/or operate to receive various user input.

In one or more aspects, the client 606 can include program instructions stored on a computer-readable media, which when executed by a processor, such as the processing logic 602, provides the functions of the subscription system described herein. For example, instructions may be loaded into the device 600 from a computer-readable media, such as a floppy disk, CDROM, memory card, FLASH memory device, RAM, ROM, or any other type of memory device or computer-readable media that interfaces to the device 600 through the device resources 604. In another aspect, the instructions may be downloaded into the device 600 from a network resource that interfaces to the device 600 through the transceiver logic 608. The instructions, when executed by the processing logic 602, provide one or more aspects of a subscription system as described herein.

In one or more aspects, the resource manager 616 can include any combination of hardware and software, and operate to verify that available resources exist on the device to accommodate any services that are subscribed to during the subscription process and to verify cache requirements requested by the user. For example, if a user desires to increase cache depth, the resource manager 616 operates to determine the memory requirements of the requested cache depth and verify that enough memory is available at the memory 610.

In one or more aspects, the subscription database 614 can include any type of memory or storage logic suitable for storing information relating to packages/services to which the device 600 has subscribed. For example, the subscription database 614 can include package identifiers, service identifiers, size characteristics, resource identifiers, resource allocation requirements, scheduling information, pricing, and/or any other information about the subscription packages and services to which the device 600 has subscribed. One skilled in the art will realize that subscription database can be located in any of the components of the device 600 and/or in other components of the content delivery system.

In one or more aspects, after activation and establishment of the cache 622, the client 606 can download multiple presentations for storage in cache 622. As such, the client 606 can operate in conjunction with processing logic 602 and resource manager 616 to add and remove presentations from the cache 622.

Figure 7B:
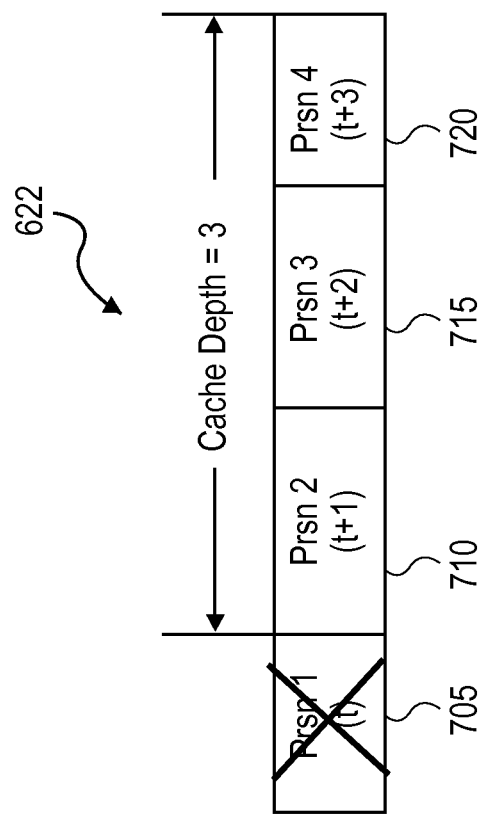
Figure 7A:
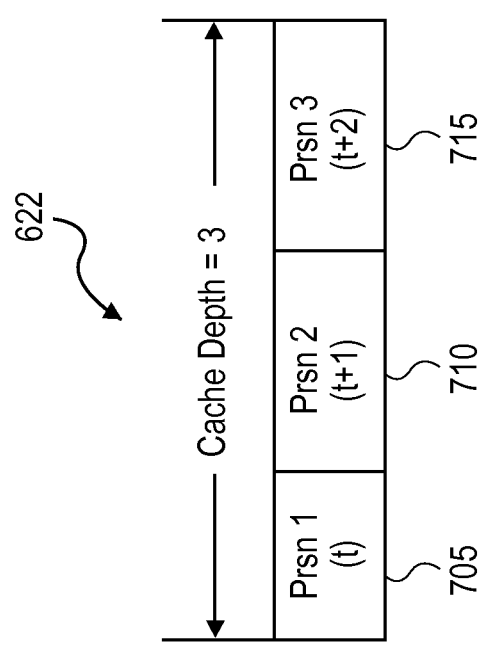

In one or more aspects, the client 606 can manage the cache 622 in FIFO fashion; i.e., the earliest downloaded presentations are deleted when new presentations are downloaded and the number of presentations on the device 600 is equal to the cache depth. FIGS. 7A and 7B illustrate an exemplary configuration of the cache 622 for receiving and storing presentations according to a cache depth. In FIGS. 7A and 7B, the device 600 can be set to a cache depth of 3 for storing presentation in the cache 622. As mentioned above, the cache depth of 3 can be a default cache depth or set of the user of the device 600.

As illustrated in FIG. 7A, the device 600 can download and store, in the cache 622, "Presentation 1" 705, "Presentation 2" 710, and "Presentation 3" 715 at times t, t+1, and t+2, respectively. "Presentation 1" 705 can be downloaded and stored at the earliest time t.

As illustrated in FIG. 7B, the device 600 can download a "Presentation 4" 720 at a time t+3. Because the cache depth is set to 3, the device 600 can delete or mark for deletion the oldest presentation, "Presentation 1" 705, when "Presentation 4" 720 has been successfully downloaded, and store "Presentation 4" 720 in the cache 622.

In one or more aspects, the presentations on the device 600 can be marked for deletion as a result of a decrease in the cache depth. If as a result of the reduction of the cache depth the number of presentations stored on the device 600 is more than the new cache depth, the presentations can be marked for deletion in the order that they were downloaded. The earliest downloaded presentations can be marked for deletion until the number of presentations available on the service is equal to the new cache depth.

FIGS. 8A and 8B illustrate an exemplary configuration of the cache 622 during alteration of the cache depth according to one or more aspects. As illustrated in FIGS. 8A and 8B, the device 600 can be set to a cache depth of 4 for storing presentations in the cache 622. The device 600 can download and store, in the cache 622, "Presentation 1" 805, "Presentation 2" 810, "Presentation 3" 815, "Presentation 4" 820 at times t, t+1, t+2, and t+3, respectively. "Presentation 1" 805 can be downloaded and stored at the earliest time t. As mentioned above, the cache depth of 4 can be a default cache depth or set of the user of the device 600.

As illustrated in FIG. 8B, the cache depth of the device 600 can be changed to 2. For example, the user of the device 600 can change the cache depth utilizing an interface generated by the client 606. The cache depth can be also be changed by other systems in the content delivery system or by the device 600, itself, based on memory demands and requirements. To implement the changed cache depth, the device 600 can delete or mark for deletion the oldest presentations stored in the cache 622, "Presentation 1" 805, "Presentation 2" 810.

In one or more aspects, as mentioned above, the user can be allowed to increase the cache depth if there is enough memory on the device 600. When the user increases the cache depth for a service, the presentations that were marked for deletion and still present on the device 600 can be made available to the user in the order of their download time till the number of presentations available on the service is equal to the cache depth. This allows presentations that are on the device 600 and were marked for deletion as a result of the user reducing the cache depth to be made available to the user again when the user increases the cache depth. Likewise, as new presentations are downloaded, the device 600 can store the new presentations in the cache 622 until the cache depth is reached.

In one or more aspects, as described above, the device 600 can manage the cache 622, according to the cache depth, in a FIFO scheme. One skilled in the art will realize that the device 600 can utilize any method or scheme by which to manage the cache 622 according to the cache depth. For example, the device 600 can delete or mark for deletion presentations that are specified by the user, that have the nearest presentation expiry time, that have the shortest expiry duration, that are inaccessible due to decryption status, and the like. Likewise, in addition to removing presentations to maintain cache depth, the device 600 can delete or mark for delete the presentation from the cache 622 based on expiry time and/or decryption status as mentioned above according to the subscribed service.

In one or more aspects, once the content is downloaded onto device 600, the client 606 operates to provide a multi-view interface that allows the user of the device 600 to view the downloaded presentations. The multi-view interface can include information from the two types of information 1, Service-specific information; and 2. Presentation-specific information.

The service-specific information can include the service title, service description and other attributes that are displayed to the user that are common to the service. The presentation-specific information can include the presentation title and presentation description and other attributes that are specific to a presentation. The presentations can be arranged in the multi-view interface according to the service-specific information and/or presentation-specific information. The client 606 can receive or download the information, from the content provider network, 104 in the presentation definition record and/or SI record.

Figure 9:
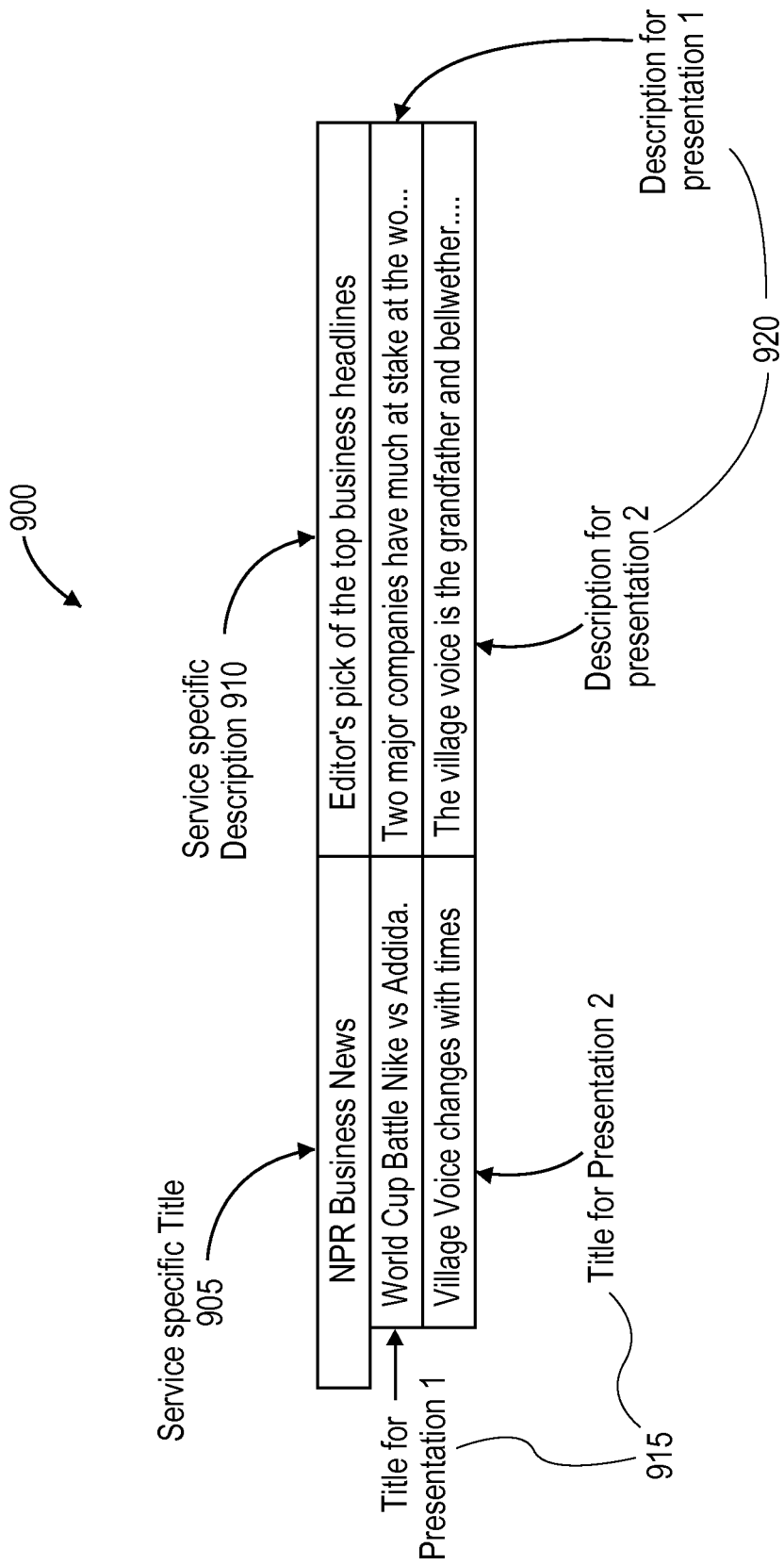
FIG. 9 illustrates an exemplary multi-view interface, according to various aspects.

FIG. 9 illustrates an example of a multi-view interface 900 that includes the service-specific information and presentation-specific information according to one or more aspects. As illustrated, the multi-view interface 900 can include service title information 905 and service description information 910. The multi-view interface 900 can also include presentation information for the service such as presentation titles 915 and presentation descriptions 920. One skilled in the art will realize that the multi-view interface 900 is an exemplary interface and that the multi-view interface 900 can display information in any format and/or arrangement.

In one or more aspects, to provide the multi-view interface, such as the multi-view interface 900, the device 600 can obtain the service-specific information from the SI record provided by the content provider network 104. Additionally, the device 600 can obtain the presentation-specific information from the presentation definition record provided by the content provider network 104. The device 600 can download the presentation definition record with the presentation. The device 600 can store the presentation definition record on the internal memory, such as memory 610, or external memory based on security and/or storage policies of the device. The multi-view interface, such as the multi-view interface 900 that is presented to the user provides the user with the presentations that have been downloaded on the device 600.

In one or more aspects, if the device 600 downloaded a presentation to external memory in the past, the presentation may be unavailable to the user under the following exemplary scenarios:

1. the presentation was stored on an external card and the card was either removed from the device 600 or replaced by another external card that does not have the presentation; and 2. the device 600 encounters a read error while trying to read from the external card.

In the above exemplary scenarios, the user may not be able to access the content even though the presentation-specific information indicates that the presentation is available on the device 600. In these scenarios, the multi-view interface, such as the multi-view interface 900, can provide the user with an appropriate error message. Likewise, the device 600 can provide a separate error message if the presentation is unavailable due to external memory. Additionally, the device 600 can include, in the either error message, the presentation-specific information for a presentation from the presentation definition record associated and the service-specific information for a service from the service definition SI.

In one or more aspects, as described above, the device 600 can be set to a default cache depth and the user can alter to the cache depth utilizing client 606. Additionally, other components of the content delivery system, such as the content provider 102 (e.g. CP server 200), content provider network 104, or content server 122 (e.g. CS server 300) can specify the default cache depth, alter the cache depth, or calculate and specify other parameters associated with the cache depth, such as maximum cache depth, maximum presentation size, memory requirements, and the like, as described above. To provide these parameters, the components of the content delivery system can provide the parameters in the records, such as the SI record and presentation definition records, provided with the content. For example, the SI record can contain a field for the default cache depth, a field for the maximum cache depth and maximum presentation size for the service and a field for the memory requirement for a service based on the default cache depth.

Figure 10:
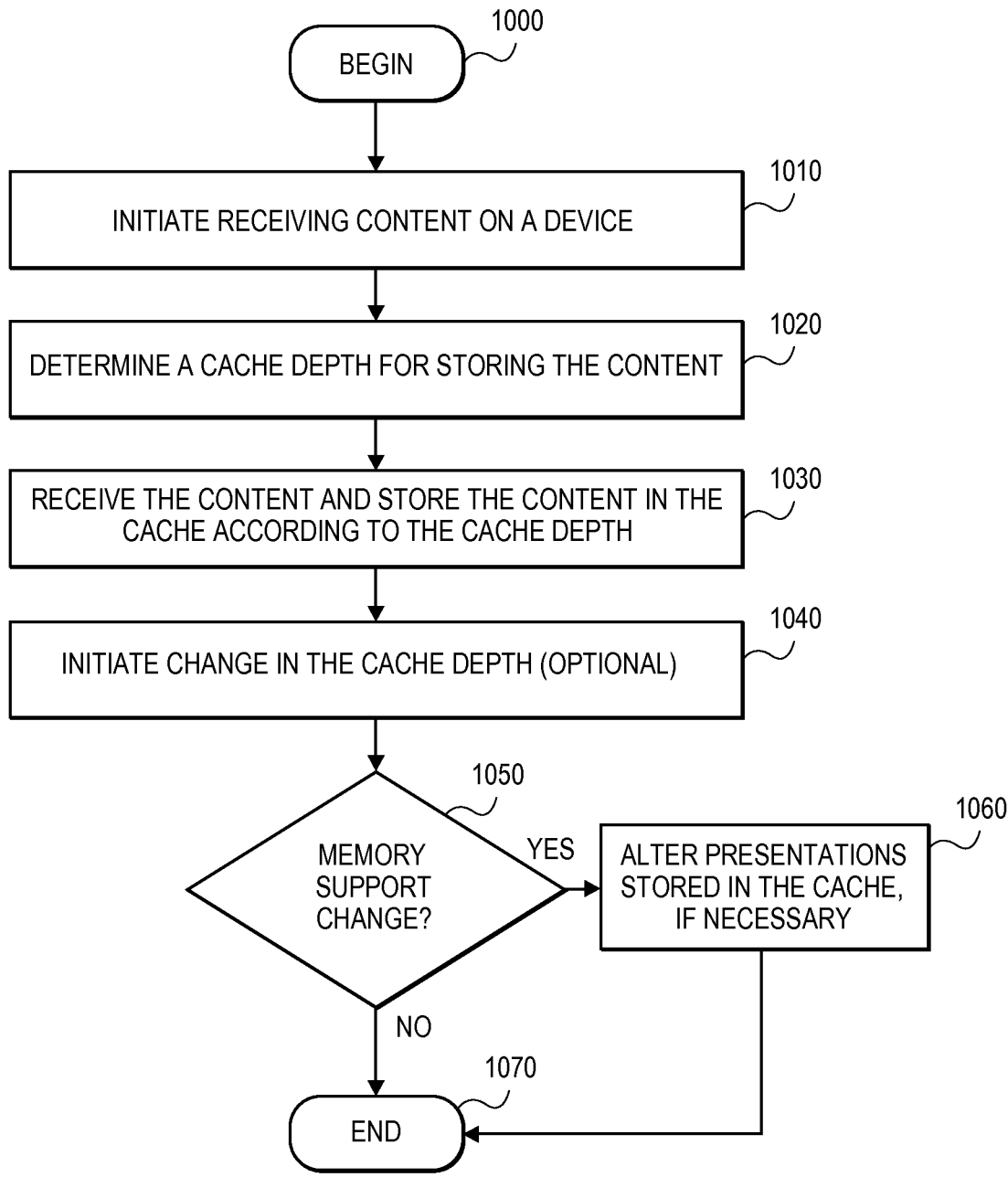
FIG. 10 illustrates an exemplary process for receiving and storing content, according to various aspects.

FIG. 10 illustrates an exemplary process for receiving content and storing the content in cache, according to one or more aspects. In 1000, the process can begin. In 1010, a device 600 can initiate receiving content on the device 600. For example, the device 600 can subscribe to one or more services from the content provider network 104. The device 600 can communicate with the content provider network 104 utilizing the client 606 in order to subscribe to the one or more services.

In 1020, the device 600 can determine a cache depth for storing content in the device 600. The cache depth can represent the number of presentations from the content that will be stored in the cache 622. For example, the device 600 can be configured to set the cache depth to a default cache depth contained specified in the client 606 or received from the content provider network 104 or other systems in the content delivery system. Additionally, the device 600 can be configured to receive a cache depth from a user of the device 600. The device 600 can verify that the memory 610 can support the memory requirement of the received cache depth.

In 1030, the device 600 can receive the content from the content provider network 104 and store the content in the cache 622 according to the cache depth. For example, as presentations are received, the device 600 can store the presentations in the cache 622 until the cache depth is reached. Once reached, the device 600 can delete or mark for deletion previously stored presentations as new presentations are received. The device 600 can delete or mark for deletion the presentations based on a FIFO scheme.

In 1040, the device 600 can initiate a change in the cache depth. The change can include an increase in the cache depth or a decrease in the cache depth. The device can initiate the change in the cache depth based on a request from the user, a change in the cache depth received from the content provider network 104 or other systems, and/or any memory changes or requirements of the device 600.

In 1050, the device 600 can determine if the change in the cache depth can be supported by the memory 610. For example, if the cache depth is increased, the device 600 can determine the memory requirement of the increased cache depth and check the memory 610 to determine if the memory 610 can support the memory requirement. In 1060, if the memory 610 can support the change, the device 600 can alter the stored content of the cache 622 based on the change in the cache depth. For example, if the cache depth is decreased, the device 600 can delete or mark for deletion one or more stored presentations in order to conform the cache 622 to the change in the cache depth. The device 600 can delete or mark for deletion the presentation based on a FIFO scheme.

In 1070, the process can end, but the process can return to any point and repeat.

The foregoing description is illustrative, and variations in configuration and implementation may occur to persons skilled in the art. For instance, the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description is illustrative, and variations in configuration and implementation may occur to persons skilled in the art. For example, while aspects have been described in which media content is served via a wireless content delivery system, in aspects a content delivery platform that in addition or instead uses a wired or optical network for delivery of media can also be used. Other resources described as singular or integrated can in aspects be plural or distributed, and resources described as multiple or distributed can in aspects be combined. The scope of the invention is accordingly intended to be limited only by the following claims.

The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method of receiving and storing content in a wireless device, comprising:
    initiating delivery of content from at least one service to the wireless device;
    determining a cache depth for a cache for storing the content in the wireless device, wherein the cache depth determines a number of portions of the content to store in the cache;
    receiving, via a wireless broadcast, the portions of the content from the at least one service;
    storing the wirelessly-broadcasted portions of the content in the cache;
    examining the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
    removing the stored wirelessly-broadcasted portions of the content that have expired.

2. The method of claim 1, further comprising:
    receiving a request to increase the cache depth;
    determining a storage requirement for the increase in the cache depth, wherein the storage requirement is based on the increase in the cache depth and a maximum size of the wirelessly-broadcasted portions of the content; and
    increasing the cache depth if the storage requirement does not exceed available storage.

3. The method of claim 1, further comprising:
    receiving a request to decrease the cache depth;
    determining if the stored wirelessly-broadcasted portions of the content exceed the decreased cache depth;
    removing the stored wirelessly-broadcasted portions of the content, first stored in the cache, that exceed the decreased cache depth; and
    decreasing the cache depth based on the request.

4. The method of claim 1, further comprising:
    receiving new wirelessly-broadcasted portions of the content to store in the cache;
    determining if the new wirelessly-broadcasted portions of the content in combination with the stored wirelessly-broadcasted portions of the content exceed the cache depth;
    removing the stored wirelessly-broadcasted portions of the content, first stored in the cache, that exceed the cache depth; and
    storing the new wirelessly-broadcasted portions of the content in the cache.

5. The method of claim 1, wherein examining the stored wirelessly-broadcasted portions of the content comprises determining if a key for any of the stored wirelessly-broadcasted portions of the content has expired.

6. The method of claim 1, wherein the content comprises at least one of video content, audio content and textual content.

7. The method of claim 1, wherein the wireless device comprises at least one of a cellular telephone, a network-enabled personal digital assistant, and a portable network-enabled media player.

8. The method of claim 1, wherein the determined cache depth is a default cache depth.

9. A wireless device, the wireless device being configured to receive content, comprising:
    an interface to a server;
    a cache for storing content; and
    a processor, communicating with the interface and cache, the processor being configured to:
        initiate delivery of content from at least one service to the wireless device;
        determine a cache depth for the cache for storing the content, wherein the cache depth determines a number of portions of the content to store in the cache;
        receive, via a wireless broadcast, the portions of the content from the at least one service;
        store the wirelessly-broadcasted portions of the content in the cache;
        examine the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
        remove the stored wirelessly-broadcasted portions of the content that have expired.

10. The wireless device of claim 9, wherein the processor is further configured to:
    receive a request to increase the cache depth;
    determine a storage requirement for the increase in cache depth, wherein the storage requirement is based on the increase in the cache depth and a maximum size of the wirelessly-broadcasted portions of the content; and
    increase the cache depth if the storage requirement does not exceed available storage.

11. The wireless device of claim 9, wherein the processor is further configured to:
    receive a request to decrease the cache depth;
    determine if the stored wirelessly-broadcasted portions of the content exceed the decreased cache depth;
    remove the stored wirelessly-broadcasted portions of the content, first stored in the cache, that exceed the decreased cache depth; and
    decrease the cache depth based on the request.

12. The wireless device of claim 9, wherein the processor is further configured to:
- receive new wirelessly-broadcasted portions of the content to store in the cache;
- determine if the new wirelessly-broadcasted portions of the content in combination with the stored wirelessly-broadcasted portions of the content exceed the cache depth;
- remove the stored wirelessly-broadcasted portions of the content, first stored in the cache, that exceed the cache depth; and
- store the new wirelessly-broadcasted portions of the content in the cache.

13. The wireless device of claim 9, wherein examining the stored wirelessly-broadcasted portions of the content comprises determining if a key for any of the stored wirelessly-broadcasted portions of the content has expired.

14. The wireless device of claim 9, wherein the content comprises at least one of video content, audio content and textual content.

15. The wireless device of claim 9, wherein the wireless device comprises at least one of a cellular telephone, a network-enabled personal digital assistant, and a portable network-enabled media player.

16. The wireless device of claim 9, wherein the determined cache depth is a default cache depth.

17. A wireless device, the wireless device being configured to receive content, comprising:
- means for interfacing with a server;
- means for caching the content; and
- means for processing, the means for processing communicating with the interfacing means and caching means, the means for processing being configured to:
  - initiate delivery of content from at least one service to the wireless device;
  - determine a cache depth for the caching means, wherein the cache depth determines a number of portions of the content to store in the caching means;
  - receive, via a wireless broadcast, the portions of the content from the at least one service;
  - store the wirelessly-broadcasted portions of the content in the caching means;
  - examine the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
  - remove the stored wirelessly-broadcasted portions of the content that have expired.

18. The wireless device of claim 17, the means for processing being further configured to:
- receive a request to increase the cache depth;
- determine a storage requirement for the increase in cache depth, wherein the storage requirement is based on the increase cache depth and a maximum size of the wirelessly broadcasted portions of the content; and
- increase the cache depth if the storage requirement does not exceed available storage.

19. The wireless device of claim 17, the means for processing being further configured to:
- receive a request to decrease the cache depth;
- determine if the stored wirelessly-broadcasted portions of the content exceed the decreased cache depth;
- remove the stored wirelessly-broadcasted portions of the content, first stored in the cache, that exceed the decreased cache depth; and
- decrease the cache depth based on the request.

20. The wireless device of claim 17, the means for processing being further configured to:
- receive new wirelessly-broadcasted portions of the content to store in the cache;
- determine if the new wirelessly-broadcasted portions of the content in combination with the stored wirelessly-broadcasted portions of the content exceed the cache depth;
- remove the stored wirelessly-broadcasted portions of the content, first stored in the cache, that exceed the cache depth; and
- store the new wirelessly-broadcasted portions of the content in the cache.

21. The wireless device of claim 17, the means for processing being further configured to determine if a key for any of the stored wirelessly-broadcasted portions of the content has expired.

22. The wireless device of claim 17, wherein the content comprises at least one of video content; audio content and textual content.

23. The wireless device of claim 17, wherein the wireless device comprises at least one of a cellular telephone, a network-enabled personal digital assistant, and a portable network-enabled media player.

24. The wireless device of claim 17, wherein the determined cache depth is a default cache depth.

25. A computer-readable medium, the computer-readable medium being readable to execute a method comprising:
- initiating delivery of content from at least one service to a wireless device;
- determining a cache depth for a cache for storing the content in the wireless device, wherein the cache depth determines a number of portions of the content to store in the cache;
- receiving, via a wireless broadcast, the portions of the content from the at least one service;
- storing the wirelessly-broadcasted portions of the content in the cache;
- examining, the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
- removing the stored wirelessly-broadcasted portions of the content that have expired.

26. The computer-readable medium of claim 25, the method further comprising:
- receiving a request to increase the cache depth;
- determining a storage requirement for the increase in the cache depth, wherein the storage requirement is based on the increase in the cache depth and a maximum size of the wirelessly-broadcasted portions of the content; and
- increasing the cache depth if the storage requirement does not exceed available storage.

27. The computer-readable medium of claim 25, the method further comprising:
- receiving a request to decrease the cache depth;
- determining if the stored wirelessly-broadcasted portions of the content exceed the decreased cache depth;

removing the stored wirelessly-broadcasted portions of the content, first stored in the cache, that exceed the decreased cache depth; and
decreasing the cache depth based on the request.

28. The computer-readable medium of claim 25, the method further comprising:
receiving new wirelessly-broadcasted portions of the content to store in the cache;
determining if the new wirelessly-broadcasted portions of content in combination with the stored wirelessly-broadcasted portions of the content exceed the cache depth;
removing the stored wirelessly-broadcasted portions of the content, first stored in the cache, that exceed the cache depth; and
storing the new wirelessly-broadcasted portions of the content in the cache.

29. The computer-readable medium of claim 25, wherein examining the stored wirelessly-broadcasted portions of the content comprises determining if a key for any of the stored wirelessly-broadcasted portions of the content has expired.

30. The computer-readable medium claim 25, wherein the content comprises at least one of video content, audio content and textual content.

31. The computer-readable medium of claim 25, wherein the wireless device comprises at least one of a cellular telephone, a network-enabled personal digital assistant, and a portable network-enabled media player.

32. The computer-readable medium of claim 25, wherein the determined cache depth is a default cache depth.

33. A method of delivering content to a wireless device, comprising:
receiving a request to deliver content from at least one service to the wireless device;
determining a maximum cache depth for the wireless device, wherein the maximum cache depth determines a maximum number of portions of the content that can be stored in a cache of the wireless device;
providing, via a wireless broadcast, the maximum cache depth to the wireless device;
determining expiry times for the portions of the content; and
providing, via a wireless broadcast, the expiry times with the portions of the content to the wireless device.

34. The method of claim 33, further comprising:
determining a default cache depth for the cache;
determining a storage requirement for the cache, wherein the storage requirement is based on the default cache depth and a maximum size of the portions of the content; and
providing the storage requirement to the wireless device.

35. The method of claim 33, further comprising:
determining keys for the portions of the content; and
providing the keys with the portions of the content to the wireless device.

36. The method of claim 33, further comprising:
determining information about the at least one service; and
providing the information with the portions of the content to the wireless device.

37. The system of claim 33, wherein the content comprises at least one of video content, audio content, and textual content.

38. The system of claim 33, wherein the wireless device comprises at least one of a cellular telephone, a network-enabled personal digital assistant, and a portable network-enabled media player.

39. A system for delivering content to a wireless device, comprising:
an interface to a wireless device; and
a server, communicating with the interface, the server being configured to:
receive a request to deliver content from at least one service to the wireless device;
determine a maximum cache depth for the wireless device, wherein the maximum cache depth determines a maximum number of portions of the content that can be stored in a cache of the wireless device;
provide, via a wireless broadcast, the maximum cache depth to the wireless device;
determine expiry times for the portions of the content; and
provide, via a wireless broadcast, the expiry times with the portions of the content to the wireless device.

40. The system of claim 39, the server being further configured to determine a default cache depth for the cache;
determine a storage requirement for the cache, wherein the storage requirement is based on the default cache depth and a maximum size of the portions of the content; and
provide the storage requirement to the wireless device.

41. The system of claim 39, the server being further configured to determine keys for the portions of the content; and
provide the keys with the portions of the content to the wireless device.

42. The system of claim 39, the server being further configured to determine information about the at least one service; and
provide the information with the portions of the content to the wireless device.

43. The system of claim 39, wherein the content comprises at least one of video content, audio content, and textual content.

44. The system of claim 39, wherein the wireless device comprises at least one of a cellular telephone, a network-enabled personal digital assistant, and a portable network-enabled media player.

45. The system of claim 39, wherein the interface comprises a wireless interface.

46. A system for delivering content to a wireless device, comprising:
means for interfacing to a wireless device; and
means for serving content, the means for serving content communicating with the means for interfacing, the means for serving content being configured to:
receive a request to deliver content from at least one service to the wireless device;
determine a maximum cache depth for the wireless device, wherein the maximum cache depth determines a maximum number of portions of the content that can be stored in a cache of the wireless device;
provide, via a wireless broadcast, the maximum cache depth to the wireless device;
determine expiry times for the portions of the content; and
provide, via a wireless broadcast, the expiry times with the portions of the content to the wireless device.

47. The system of claim 46, the means for serving content being further configured to:
determine a default cache depth for the cache;
determine a storage requirement for the cache, wherein the storage requirement is based on the default cache depth and a maximum size of the portions of the content; and
provide the storage requirement to the wireless device.

48. The system of claim 46, the means for serving content being further configured to:

determine keys for the portions of the content; and
provide the keys with the portions of the content to the wireless device.

49. The system of claim 46, the means for serving content being further configured to:
determine information about the at least one service; and
provide the information with the portions of the content to the wireless device.

50. The system of claim 46, wherein the content comprises at least one of video content, audio content, and textual content.

51. The system of claim 46, wherein the wireless device comprises at least one of a cellular telephone, a network-enabled personal digital assistant, and a portable network-enabled media player.

52. The system of claim 46, the means for interfacing to a wireless device being configured to interface to a wireless interface.

53. A computer-readable medium, the computer-readable medium being readable to execute a method of delivering content to a wireless device, the method comprising:
receiving a request to deliver content from at least one service to the wireless device;
determining a maximum cache depth for the wireless device, wherein the maximum cache depth determines a maximum number of portions of the content that can be stored in a cache of the wireless device;
providing, via a wireless broadcast, the maximum cache depth to the wireless device;
determining expiry times for the portions of the content; and
providing, via a wireless broadcast, the expiry time with the portions of the content to the wireless device.

54. The computer-readable medium of claim 53, the method further comprising:
determining a default cache depth for the cache;
determining a storage requirement for the cache, wherein the storage requirement is based on the default cache depth and a maximum size of the portions of the content; and
providing, the storage requirement to the wireless device.

55. The computer-readable medium of claim 53, the method further comprising:
determining keys for the portions of the content; and
providing the keys with the portions of the content to the wireless device.

56. The computer-readable medium of claim 53, the method further comprising:
determining information about the at least one service; and
providing the information with the portions of the content to the wireless device.

57. The computer-readable medium of claim 53, the method wherein the content comprises at least one of video content, audio content, and textual content.

58. The computer-readable medium of claim 53, the method wherein the wireless device comprises at least one of a cellular telephone, a network-enabled personal digital assistant, and a portable network-enabled media player.

59. A service information record associated with content for delivery to a wireless device, the service information record being generated by a method comprising:
receiving a request to deliver content from at least one service to the wireless device;
determining a maximum cache depth for the wireless device, wherein the maximum cache depth determines a maximum number of portions of the content that can be stored in a cache of the wireless device;
storing the maximum cache depth in the service information record;
determining expiry times for the portions of the content; and
storing the expiry times with the portions of the content for delivery to the wireless device.

60. The service information record of claim 59, the method further comprising:
determining a default cache depth for the cache;
determining a storage requirement for the cache, wherein the storage requirement is based on the default cache depth and a maximum size of the portions of the content; and
storing the storage requirement in the service information record.

61. The service information record of claim 59, the method further comprising:
determining keys for the portions of content; and
storing, the keys with the portions of the content for delivery to the wireless device.

62. The service information record of claim 59, the method further comprising:
determining information about the at least one service; and
storing the information with the portions of the content for delivery to the wireless device.

63. The service information record of claim 59, wherein the content comprises at least one of video content, audio content, and textual content.

64. The service information record of claim 59, wherein the wireless device comprises at least one of a cellular telephone, a network-enabled personal digital assistant, and a portable network-enabled media player.

65. A method in a wireless device, comprising:
receiving, via a wireless broadcast, portions of content from at least one service;
storing the wirelessly-broadcasted portions of the content in a cache on the wireless device, the cache having, a cache depth that determines a number of portions of the content to store in the cache;
examining the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
removing the stored wirelessly-broadcasted portions of the content that have expired.

66. The method of claim 65, further comprising:
receiving a request to increase the cache depth;
determining a storage requirement for the increase in the cache depth, wherein the storage requirement is based on the increase in the cache depth and a maximum size of the wirelessly-broadcasted portions of the content; and
increasing the cache depth if the storage requirement does not exceed available storage.

67. The method of claim 65, further comprising:
receiving a request to decrease the cache depth;
determining if the stored wirelessly-broadcasted portions of the content exceed the decreased cache depth;
removing the stored wirelessly-broadcasted portions of the content, first stored in the cache, that exceed the decreased cache depth; and
decreasing the cache depth based on the request.

68. The method of claim 65, further comprising:
receiving new wirelessly-broadcasted portions of the content to store in the cache;

determining if the new wirelessly-broadcasted portions of the content in combination with the stored wirelessly-broadcasted portions of the content exceed the cache depth;

removing the stored wirelessly-broadcasted portions of the content, first stored in the cache, that exceed the cache depth; and storing the new wirelessly-broadcasted portions of the content in the cache.

69. The method of claim 65, wherein examining the stored wirelessly-broadcasted portions of the content comprises determining if a key for any of the stored wirelessly-broadcasted portions of the content has expired.

70. The method of claim 65, wherein the content comprises at least one of video content, audio content and textual content.

71. The method of claim 65, wherein the wireless device comprises at least one of a cellular telephone, a network-enabled personal digital assistant, and a portable network-enabled media player.

72. The method of claim 65, wherein the cache depth comprises a default cache depth.

73. A wireless device comprising:
a cache; and
a processor communicating with the cache, the processor being configured to:
receive, via a wireless broadcast, portions of content from at least one service;
store the wirelessly-broadcasted portions of the content in the cache, the cache having a cache depth that determines a number of portions of the content to store in the cache;
examine the stored wirelessly-broadcasted portions of the content in the wireless device to determine if any of the stored wirelessly-broadcasted portions of the content have expired, wherein examining, the stored wirelessly-broadcasted portions of the content comprises determining if any of the stored wirelessly-broadcasted of the content have exceeded an expiration duration; and
remove the stored wirelessly-broadcasted portions of the content that have expired.

74. The wireless device of claim 73, wherein the processor is further configured to:
receive a request to increase the cache depth;
determine a storage requirement for the increase in the cache depth, wherein the storage requirement is based on the increase in the cache depth and a maximum size of the wirelessly-broadcasted portions of the content; and
increase the cache depth if the storage requirement does not exceed available storage.

75. The wireless device of claim 73, wherein the processor is further configured to:
receive a request to decrease the cache depth;
determine if the stored wirelessly-broadcasted portions of the content exceed the decreased cache depth;
remove the stored wirelessly-broadcasted portions of the content, first stored in the cache, that exceed the decreased cache depth; and
decrease the cache depth based on the request.

76. The wireless device of claim 73, wherein the processor is further configured to:
receive new wirelessly-broadcasted portions of the content to store in the cache;
determine if the new wirelessly-broadcasted portions of the content in combination with the stored wirelessly-broadcasted portions of the content exceed the cache depth;
remove the stored wirelessly-broadcasted portions of the content, first stored in the cache, that exceed the cache depth; and
store the new wirelessly-broadcasted portions of the content in the cache.

77. The wireless device of claim 73, wherein examining the stored wirelessly-broadcasted portions of the content comprises determining if a key for any of the stored wirelessly-broadcasted portions of the content has expired.

78. The wireless device of claim 73, wherein the content comprises at least one of video content, audio content and textual content.

79. The wireless device of claim 73, wherein the wireless device comprises at least one of a cellular telephone, a network-enabled personal digital assistant, and a portable network-enabled media player.

80. The wireless device of claim 73, wherein the cache depth comprises a default cache depth.

81. A wireless device comprising:
means for caching; and
means for processing communicating with the caching means, the means for processing being configured to:
receive, via a wireless broadcast, portions of content from at least one service;
store the wirelessly-broadcasted portions of the content in the caching means, the caching means having a cache depth that determines a number of portions of the content to store in the cache;
examine the stored wirelessly-broadcasted portions of the content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
remove the stored wirelessly-broadcasted portions of the content that have expired.

82. The wireless device of claim 81, the means for processing being further configured to:
receive a request to increase the cache depth;
determine a storage requirement for the increase in the cache depth, wherein the storage requirement is based on the increase in the cache depth and a maximum size of the wirelessly- broadcasted portions of the content; and
increase the cache depth if the storage requirement does not exceed available storage.

83. The wireless device of claim 81, the means for processing being further configured to:
receive a request to decrease the cache depth;
determine if the stored wirelessly-broadcasted portions of the content exceed the decreased cache depth;
remove the stored wirelessly-broadcasted portions of the content, first stored in the cache, that exceed the decreased cache depth; and
decrease the cache depth based on the request.

84. The wireless device of claim 81, the means for processing being further configured to:
receive new wirelessly-broadcasted portions of the content to store in the cache;
determine if the new wirelessly-broadcasted portions of the content in combination with the stored wirelessly-broadcasted portions of the content exceed the cache depth;
remove the stored wirelessly-broadcasted portions of the content, first stored in the cache, that exceed the cache depth; and store the new wirelessly-broadcasted portions of the content in the cache.

85. The wireless device of claim 81, the means for processing being further configured to determine if a key for any of the stored wirelessly-broadcasted portions of the content has expired.

86. The wireless device of claim 81, wherein the content comprises at least one of video content, audio content and textual content.

87. The wireless device of claim 81, wherein the wireless device comprises at least one of a cellular telephone, a network-enabled personal digital assistant, and a portable network-enabled media player.

88. The wireless device of claim 81, wherein the cache depth comprises a default cache depth.

89. A computer-readable medium, the computer-readable medium being readable to execute a method comprising:
    receiving, via a wireless broadcast, portions of content from at least one service;
    storing the wirelessly-broadcasted portions of the content in a cache on the wireless device, the cache having a cache depth that determines a number of portions of the content to store in the cache;
    examining the stored wirelessly-broadcasted portions of content in the wireless device to determine if any of the stored wirelessly-broadcasted portions of the content have expired, wherein examining the stored wirelessly-broadcasted portions of the content comprises determining if any of the stored wirelessly-broadcasted portions of the content have exceeded an expiration duration; and
    removing the stored wirelessly-broadcasted portions of the content that have expired.

90. The computer-readable medium of claim 89, the method further comprising:
    receiving a request to increase the cache depth;
    determining a storage requirement for the increase in the cache depth, wherein the storage requirement is based on the increase in the cache depth and a maximum size of the wirelessly-broadcasted portions of the content; and
    increasing the cache depth if the storage requirement does not exceed available storage.

91. The computer-readable medium of claim 89, the method further comprising:
    receiving, a request to decrease the cache depth;
    determining if the stored wirelessly-broadcasted portions of the content exceed the decreased cache depth;
    removing the stored wirelessly-broadcasted portions of the content, first stored in the cache, that exceed the decreased cache depth; and
    decreasing the cache depth based on the request.

92. The computer-readable medium of claim 89, the method further comprising:
    receiving new wirelessly-broadcasted portions of the content to store in the cache;
    determining if the new wirelessly-broadcasted portions of the content in combination with the stored wirelessly-broadcasted portions of the content exceed the cache depth;
    removing the stored wirelessly-broadcasted portions of the content, first stored in the cache, that exceed the cache depth; and
    storing the new wirelessly-broadcasted portions of the content in the cache.

93. The computer-readable medium of claim 66, wherein examining the stored wirelessly-broadcasted portions of the content comprises determining if a key for any of the stored wirelessly-broadcasted portions of the content has expired.

94. The computer-readable medium claim 89, wherein the content comprises at least one of video content, audio content and textual content.

95. The computer-readable medium of claim 89, wherein the wireless device comprises at least one of a cellular telephone, a network-enabled personal digital assistant, and a portable network-enabled media player.

96. The computer-readable medium of claim 89, wherein the cache depth comprises a default cache depth.

* * * * *